United States Patent

[11] 3,555,189

[72] Inventor Jesse T. Quatse
613 Copeland St., Pittsburgh, Pa.
[21] Appl. No. 684,217
[22] Filed Nov. 20, 1967
Division of Ser. No. 620,760, Mar. 6, 19<7, Patent No. 3,505,474.
[45] Patented Jan. 12, 1971

[54] AUTOMATIC TELEPHONE ANSWERING MECHANISM
2 Claims, 3 Drawing Figs.

[52] U.S. Cl. .......... 179/1
[51] Int. Cl. .......... H04m 1/64
[50] Field of Search .......... 179/16, 2C, 5P, 1HFT, 18.03, 84, 175.2B

[56] References Cited
UNITED STATES PATENTS

| | | | |
|---|---|---|---|
| 1,973,081 | 9/1934 | Keiser | 179/1 |
| 2,553,084 | 5/1951 | Favre | 179/84 |
| 2,562,069 | 7/1951 | Stein et al. | 179/147 |
| 3,248,481 | 4/1966 | Grote et al. | 179/1 |
| 3,376,390 | 4/1968 | Hashimoto | 179/1 |

*Primary Examiner*—Kathleen H. Claffy
*Assistant Examiner*—Jon Bradford Leaheey
*Attorney*—Edward H. Loveman

ABSTRACT: An improved Automatic Telephone Answering Mechanism comprising a novel ring detector means which determines the proper time sequence of ringing and silence by timing and logic circuit networks, thereby filtering out spurious telephone rings to automatically answer an associated telephone only when a true call is being made.

INVENTOR.
Jesse T. Quatse

BY

Edward H. Loveman
ATTORNEY

INVENTOR.
Jesse T. Quatse
BY
Edward H. Loveman
ATTORNEY

AUTOMATIC TELEPHONE ANSWERING MECHANISM

This is a division of Ser. No. 620,760 filed on Mar. 6, 1967, now Pat. No. 3,505,474.

The present invention relates to computer terminals and, more particularly, to portable computer terminals operative over conventional telephone channels via a standard telephone to transmit and receive information from a central computer.

Computers have become a practically indispensable tool in essentially all disciplines and particularly those requiring access to large quantities of information or involving mathematical analysis. A principal drawback to the even greater use of general purpose computers is the lack of ready access thereto by a great many potential users. The inaccessability may be due to economic reasons. The cost may be reduced by recently developed time-sharing techniques for operating a central computer unit. Nonetheless, this does not solve the problem of a user transmitting information to the computer to enable it to supply the desired return information, which must, by some means, be transmitted back to the user.

It thus would be highly desirable if a computer terminal could be provided for a user which would provide practically immediate access to the full programming power of a computer, which might be located at a distant computer center. Full programming power requires full page printout and full alpha-numeric type in. A user could thus be capable of programming the computer via the terminals requesting information from the computer via the terminal, and receiving the requested information at the terminal. Computer terminals which provide full programming capability have been provided which permit access to a distant computer; however, these terminals require a direct tie-in with the computer through, for example, a direct and permanent connection into telephone cables of a telephone network. Moreover, the equipment required in such terminals is not intended to be portable being relatively complex, large in size and heavy.

A highly useful terminal would thus be one which would be portable in nature, while permitting ready access to a central computer, full alpha-numeric input to the computer, and a visual full-page readout of the requested information. Such a portable terminal would be increasingly attractive if correspondence with the computer could be effected over conventional telephone channels via a standard telephone. This essentially would provide access to the computer from the desk of the user.

In accordance with the present invention a new and improved portable computer terminal has been provided for communicating with a distant computer over conventional telephone channels via a standard telephone. The terminal accomplishes this by the user requesting information by converting the question to be asked into code form and transmitting the code via the telephone and telephone channel to the computer. The requested information is then transmitted from the computer in code form and received by the terminal and demodulated to be visually displayed for the user.

A new and improved automatic answering device is moreover provided for use in the portable computer terminal. This device is in response to the proper time sequence of ringing and silence and answers automatically the associated telephone of the terminal to receive incoming information.

Accordingly an object of the invention is to provide a new and improved portable computer terminal.

It is a further object to provide a new and improved portable computer terminal operative over conventional telephone channels via a standard telephone.

It is a further object to provide a new and improved portable computer terminal which provides user access to a distant computer center and provides a full-page visual readout to the user of the received information. It is a further object to provide a portable computer terminal operative over conventional telephone channels via a standard telephone which uses standard teletypewriter codes for the transmission and reception of information.

It is a still further object to provide a portable computer terminal operative over conventional telephone channels via a standard telephone which utilizes a new and improved automatic answering mechanism which automatically answers the telephone when information is to be received from a distant computer.

These and other objects and many of the attendant advantages of this invention will be readily appreciated as the same becomes better understood by reference to the following detailed description when considered in connection with the accompanying drawings in which.

Figure 1:
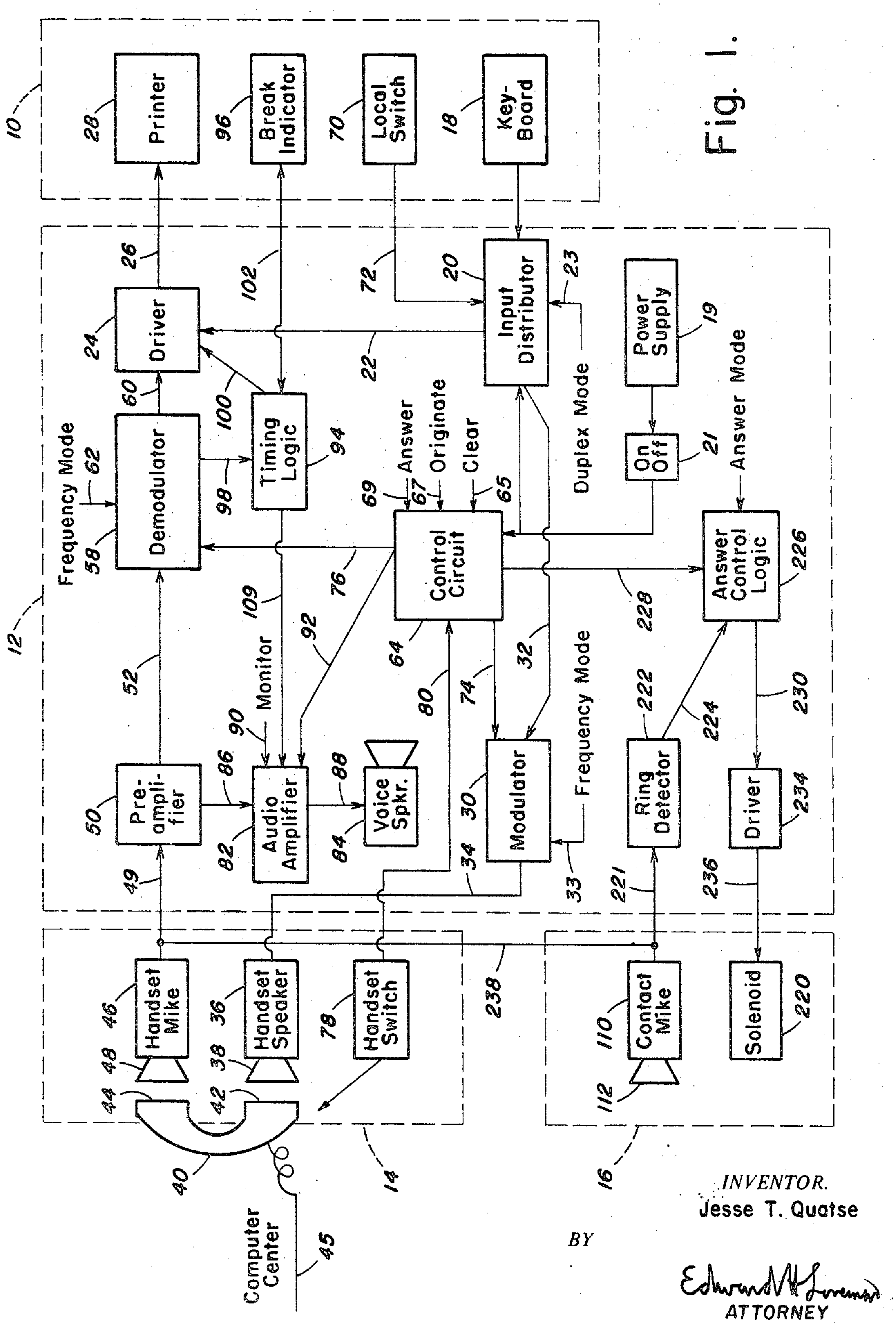
FIG. 1 is a block diagram of the portable computer terminal of the present invention.

Referring now to the drawings, wherein like reference characters designate like or corresponding parts throughout the several views, FIG. 1 is broken down into functional groups including: a portable Teletype terminal, indicated by a dotted box 10; a control console, indicated by a dotted box 12; a handset receptacle, indicated by a dotted box 14; and an autoanswer mechanism, indicated by a dotted box 16. Assume initially for the purposes of explanation that a communicative linkup has been established between the portable computer terminal shown in FIG. 1 and a distant computer center. Assume further that it is desired to send information from the computer terminal either in the form of a question to be asked of the computer center or a program to be applied to the computer.

A keyboard 18 is provided in the teletypewriter terminal 10. This keyboard 18 may comprise the standard alphabet and numerical keys as well as additional keys according to the type of information that is to be inputted into the computer terminal. The depressing of the various keys of the keyboard activates electrical contacts to product a teletypewriter code as is well known in the art. The opening and closing of the various contacts in response to the depressing of particular keys corresponds respectively to the mark and space teletypewriter functions. By the depressing of the proper keys of the keyboard 18, information can be applied to the computer terminal which may then be transmitted to a distant computer center. Operating power for the portable computer terminal is provided by a power supply 19. An on-off switch 21 is operative to open or close a circuit between the power supply 19 and an input distributor 20. The output of the keyboard 18 is applied to the input distributor 20, which may be operative in either a full or a half duplex mode. A duplex input 23 is provided to the input distributor 20 to select the desired mode of operation. Assuming initially that the half duplex mode has been selected, an output connection 22 of the input distributor 20 is completed to a driver 24. The output 26 of the driver 24 is applied to a printer 28, which may be a standard printer of a teletypewriter unit, and which in response to the output of the driver 24 provides a typewritten display of the input information as it is inputted through the keyboard 18. The operator of the keyboard 18 thus has an immediate visual display of the information inputted into the keyboard, which is, in many instances, essential to the proper asking of a question to the computer center or the programming of the distant computer. In the full duplex mode of operation the connection 22 between the input distributor 20 and the driver 24 is not made. Thus, in the full duplex mode the information inputted into the keyboard is not printed out.

A modulator 30 is provided which receives as an input connection 32 thereto from the input distributor 20. The modulator 30 is responsive to the contact opening and closures of the keyboard 18 which are translated through the input distributor 32 to the modulator 30. The modulator 30 acts as a frequency-shift modulator and provides audiofrequency space signals at a frequency of, for example 1,070 Hz., in response to contact closures and is frequency-shifted to provide audiofrequency mark signals at, for example 1,270 Hz., in response to contact openings. The normal mark and space frequencies can be reversed to provide an inverted mode of operation, so that the space frequency is 1,270 Hz., and the mark frequency is 1,070 Hz. A frequency mode input 33 is provided to the modulator 30 to accomplish the setting of the normal or inverted mode of operation for the modulator 30. The audiofrequency mark and space signals are taken from an output 34 of the modulator 30 and applied to a handset speaker 36 of the handset receptacle 14.

The handset speaker 36 provides audiofrequency output sounds in response to the audiofrequency electrical signals applied from the modulator 30 and, as such, acts as a conventional electroacoustical converter. The handset speaker 36 has an audio output cradle 38, which is adapted to receive the microphone portion of a conventional telephone handset. A conventional telephone handset 40 is shown in FIG. 1 having a microphone portion 42 and a speaker portion 44. The microphone portion 42 is disposed adjacent the cradle 38. By this arrangement, the audiofrequency sounds produced by the handset speaker 36 are acoustically coupled to the microphone 42 of the handset 40 and are then transmitted over a conventional telephone channel indicated by a line 45, which will transmit the audiofrequency signals from the telephone microphone 42 to a computer center. It is assumed, of course, that the computer center is adapted to receive such telephone communications. The information transmitted to the computer center is indicative of the originally inputted information at the teletypewriter and, therefore, may be utilized to either ask the computer a question in accordance to an already existing program, or it may serve to program the computer according to a desired plan of the sender of the information.

In response to the information provided to the computer center from the computer terminal, information will in turn be supplied by the computer center through the conventional channel 45 to the telephone handset 40. This information will be similarly coded in a conventional Teletype code and may be at a frequency of 2,025 Hz. as the answering space and at a frequency of 2,225 Hz. as the answering mark. Alternately, the frequency of 2,225 Hz. may be used as the answering space and 2,025 Hz. as the answering mark if the inverted frequency mode is utilized. The audiofrequency answer mark and space electrical signals are converted to audible sounds in the speaker portion 44 of the conventional handset 40. The speaker portion 44 is acoustically coupled to a handset mike 46 of the handset receptacle 14 through an audio input cradle 48 thereof, which is adapted to receive the speaker portion 44 of the handset 40. The handset mike 46 operates conventionally as an audioelectrical converter to supply audiofrequency electrical signals at an output 48. The output at the lead 49 will be electrical signals at a frequency rate corresponding to the answer mark and space frequencies. A preamplifier circuit 50 is provided to receive the audiofrequency mark and space signals from the output lead 49 and amplify these signals. The signals are taken from an output 52 of the preamplifier 50 and applied to a demodulator 58. The demodulator 58 provides unidirectional signals therefrom at an output 60 in response to the respective mark and space frequency signals inputted thereto. A frequency mode input 62 is provided for the demodulator 58 so that the normal or inverted mode of operation may be selected.

The unidirectional output signals of the demodulator 58 correspond to the mark and space coding of the teletypewriter code. These are applied to the driver 24 and are applied in the time sequence of the teletypewriter code to activate the selector magnets of the printer 28 of teletypewriter terminal 10. In response thereto, the letters and numbers corresponding to the code are printed out on the printer 28 of the teletypewriter terminal 10.

The operation as thus described has been made under the assumption that a communicative linkup has been achieved between the remote computer terminal and the computer center.

In order to set up the apparatus initially various logical functions must be performed. To establish the desired operative condition of the computer terminal, a control circuit 64 is provided which has as inputs thereto: a clear input 65, an originate input 67, and an answer input 69. Also a local-line switch 70 is provided in the teletypewriter terminal 10 with a connection 72 to the input distributor 20 whose function is to permit the information inputted on the keyboard 18 to be transmitted over the telephone line to the computer center. If the local-line switch 70 is placed in its local position, any information inputted into the keyboard 18 will be applied only locally to the input distributor 20, the driver 24 and the printer 28, which will type out this information that may be desired for test purposes. If, however, the local-line switch 70 is placed in its line condition, distributor 20 will be set up to permit the contact opening and closing information of the keyboard 18 to be translated thereto to the modulator 30 for subsequent transmission to the computer center. Operating power from the power supply 19 is also supplied to the control circuit through the on-off switch 21.

When it is desired to establish initially a communicative link between the remote computer terminal apparatus and the computer center, the clear mode is set up on the control circuit 64 via the clear input 65. An output connection 74 is thereby made from the control circuit 64 to the modulator 30 to establish the proper transmit operative condition therein, and an output connection 76 is made to the demodulator 58 to establish the proper receive condition therein.

The placement of the handset 40 into the cradles 38 and 48 causes a handset switch 78 to be actuated, with this actuation being connected to the control circuit 64 via an output connection 80 from the handset switch 78. This, in essence, tells the control circuit that the handset has been properly disposed to permit communications to the computer center. It is, of course, assumed that the telephone corresponding to the handset 40 and the computer center, are in telephone communications via the conventional telephone channel 45.

To proceed with the original setup operation, a linkup code signal is inputted into the keyboard 18 and translated through the input distributor 20 to the modulator 30 wherein it is modulated according to a frequency-shift modulation and applied to the handset speaker 36. The linkup signal code is then transferred to the computer center via the handset 40 and telephone channel 45. The computer center receives this information, and, in response thereto, it transmits the necessary computer linkup code through the telephone channel 45 to the handset 40. This information is then applied to the handset mike 46 and, as previously described, is applied to the preamplifier 50 and demodulator 58 of the computer terminal. This information is demodulated to usable mark and space information therein and applied through the driver 24 to the printer 28 to indicate with a visual readout that the computer has received the linkup code from the computer terminal and information may be transmitted by the computer terminal to the computer center for action thereby.

After the clear operation has been effected in the computer terminal, the originate input 67 may be inputted into the control circuit 64, which establishes the proper conditions in the modulator 30 via the connection 74 and the demodulator 58 via the connection 76 for the transmission from the keyboard 18 of information to the computer center as previously described.

Another independent mode of operation, called the answer mode, may be set up in the computer terminal shown in FIG. 1. If a call from the computer center is received through the telephone associated with the handset 40, the answer input 69 to the control circuit 64 is activated by the terminal operator. Then the handset 40 is placed on the cradles 38 and 48 of the handset receptacle 14. By the activation of the answer input 69 to the control circuit 64, the modulator 58 via the connection 76 is activated to be operative to demodulate information transmitted from the computer center, which is, in turn, printed out by the printer 28 as previously explained.

If it is desired to monitor incoming information at the portable computer terminal from the computer center an audio monitoring circuit is provided including an audio amplifier 82 and a voice speaker 84. The audio amplifier 82 is driven by the preamplifier 50 through an output 86 thereof. The audio amplifier 82 in turn drives the voice speaker 84 through an output 88 with sound being supplied by the voice speaker 84. In order to activate the audio amplifier 82, a monitor input 90 is provided thereto, and also a connection 92 is made from the control circuit 64. The audio monitoring circuit provides a convenient way of monitoring the information being transmitted from the computer center prior to entering the output 52 and subsequent stages.

To indicate that a particular message has ended, a break-code signal is transmitted by the transmitting facility to the receiving facility. This signal is typically a mark signal of a predetermined time length. In the computer terminal of the present circuit, a timing logic circuit 94 and a break indicator circuit 96, within the teletypewriter terminal 10 are provided to indicate that a break signal has been received. The demodulator 58 has an output 98 which is supplied to the timing logic circuit 94. Upon the reception of a break signal, the timing logic circuit 94 will supply an output via connection 100 to the driver 24 to deactivate the driver so that no signals are then applied to the printer 28. Also, the timing logic circuit 94 will activate the break indicator 96 via a connection 102, which will indicate to the user of the portable computer terminal that a break signal has been received and the information being transmitted from the computer center has been terminated. The timing logic circuit 94 also has an output 104 which is applied to the audio amplifier 82 which will deactivate this amplifier if it has been previously set to its monitoring condition. The computer terminal thus automatically upon the reception of a break signal will be deactivated.

The automatic answer mechanism 16 includes a contact microphone 110 having a handset receptacle portion 112. The contact mike 110 and receptacle portion 112 are so designed to be disposed adjacent the speaker portion 44 of the handset 40 whenever the handset is placed on the cradle of the telephone in its unused condition. A solenoid 220 is also provided which is disposed adjacent the handset 40 and upon energization will cause the handset to be removed from the contacts which are usually depressed by the handset when in the cradle of the telephone. Upon the release of the contacts, effectively taking the handset out of the cradle, the circuit is completed from a distant transmitting facility to the local telephone.

The contact mike 110 is connected via a lead 221 to a ring detector 222. If the telephone rings when the handset is in contact with the contact mike 110 the ringing signals are applied to the ring detector 222, which gives an output at a lead 224 in response thereto. This output at the lead 224 is supplied to an answer control logic circuit 226. Whenever the apparatus shown in FIG. 1 is in an answer state an input is supplied through a lead 228 from the control circuit 64 to the answer control logic circuit 226 so as to place this circuit in the proper condition to effect the automatic answering feature of the present apparatus. The answer control logic circuit 226, in response to a ring signal being detected in the ring detector 222, supplies an output at a lead 230 which is supplied to a driver 234 that amplifies this signal and supplies the solenoid 220 via an input 236 thereto. The solenoid 220 in response to the signal from the driver 234 is activated and through its plunger mechanically removes the handset 40 from the cradle contacts of the telephone so as to close the circuit between the distant computer center and the local apparatus. When this circuit is closed, information may be transmitted from the handset 40 to the contact mike 110 which has an output 238 connected to the lead 49, which is then applied to the preamplifier 50. With the circuit being completed between the computer center and the portable terminal, the operation of the circuit will be as previously described to receive, demodulate and print out the incoming information.

Figure 2:
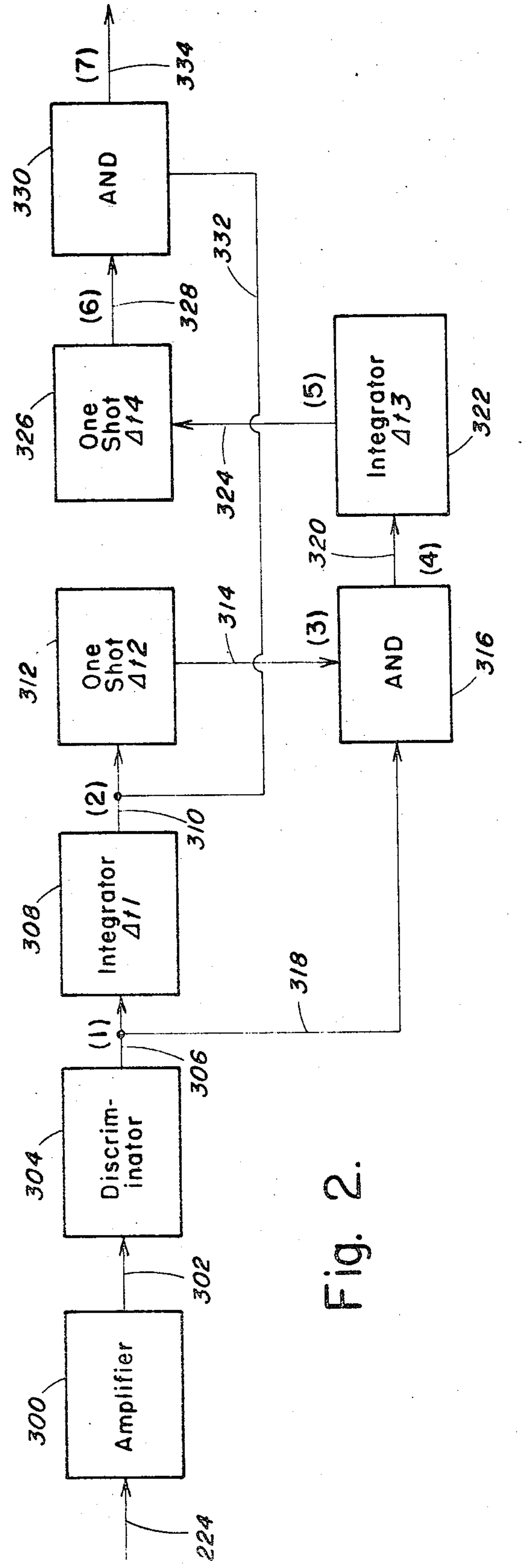
FIG. 2 is a more complete block diagram of the ring detector as shown in FIG. 1.

FIG. 2 shows a more detailed block diagram of the ring detector 222 of the automatic answer mechanism 16 shown in FIG. 1. As previously explained it is highly desirable to be capable of automatically answering the telephone so that incoming information from the distant computer center may be received and recorded without the necessity of an operator monitoring the system. However, it is highly undesirable if the ring detector functions in response to spurious ringing signals on the telephone or other spurious ambient noises in the area. Therefore, it is necessary that the autoanswering mechanism 16 function only when a true ringing signal is received on the telephone channel in use. This is accomplished through the use of the apparatus as shown in FIG. 3 which operates on the basis of the time sequence of ringing, silence and ringing as typically used for instigating a call on a standard telephone.

Figure 3:
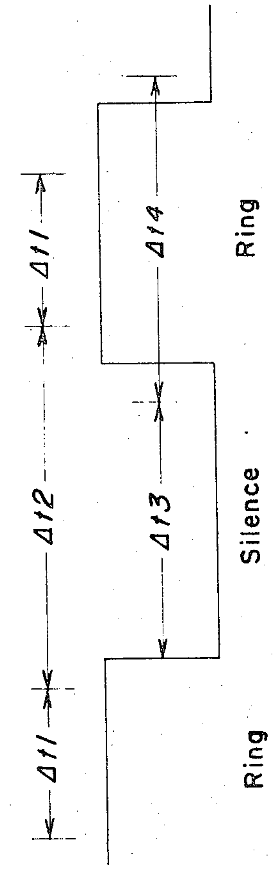
FIG. 3 is a waveform diagram used in explaining the operation of FIG. 2.

FIG. 3 shows a time plot of the occurrence of ring and silence in a typical telephone ringing sequence. Thus, as shown in FIG. 3, a ringing signal which has an alternating waveform of some predetermined frequency or frequencies occurs for some predetermined time, which, for the purpose of analysis, is shown to be less than $t1$ but greater in length than $t4$. Between the ringing signals a period of silence occurs which is shown in FIG. 3 to have a time period larger than $t2$ but shorter than the time period $t3$. The apparatus as shown in FIG. 2 functions to recognize that a true ringing signal, as shown in FIG. 3, has been received by the autoanswer mechanism 16 in FIG. 1 and performs the necessary logical steps to provide an output therefrom to activate the autoanswer mechanism 16 to complete the telephone channel between the distant communication center and the portable communication terminal.

Assume in FIG. 2 that a ring signal is received on the lead 224 from the contact microphone 110 of FIG. 1. The lead 224 is connected to an amplifier 300 which is the first ago, the ring detector. The amplifier 300 amplifies the ring signal to a predetermined level and supplies an output at a lead 302 to a discriminator 304. The discriminator 304 provides a logical output 1 at its output lead 306. The logical output 1 is indicative of whether there is ringing or silence at the input of the discriminator 304. For example, if ringing occurs the discriminator will be providing a ring output and if silence is occurring a no ring output will be provided at output 1.

An integrator 308 is provided which receives the logical output 1 of the discriminator 304 from its output lead 306. The integrator 308 is indicated to have an integrating period of $t1$ and provides a logical output 2 at an output lead 310. The logical output 2 indicates that the telephone rang for a time period of at least $t1$ as indicated in FIG. 3. The logical output 2 from the integrator 308 is applied via the lead 310 to a one-shot circuit 312 which supplies at an output lead 314 a logical output 3. When and if the logical output 3 of the one-shot circuit 312, which is indicated by the time period $t2$, occurs in response to the logical input 2, this indicates that the telephone rang for a time period of $t1$ at a time period $t2$ or less ago.

The logical input 3 is then applied via the lead 314 and to an AND circuit 316 which has as its other input the output 1 logical output of the discriminator 304, which is applied to the AND circuit 316 via a lead 318. For and AND circuit 316 to provide its logical output 4 at its output 320, it is necessary that both a logical output 1 and the logical output 3 be supplied thereto. Upon the occurrence of both the logical outputs 1 and 3 being supplied to the input of the AND gate 316, the logical output 4 appears. The logical output 4 is indicative that the telephone rang for a time period of at least $t1$, no more than the time period $t2$ ago and is not presently ringing. The logical output 1 supplies the additional sequence information that at the time under consideration the telephone has ceased ringing and is in a silence period.

The logical output 4 of the AND gate 316 is applied via a lead 320 to an integrator 322 which supplies a logical output 5 at a lead 324. The integrator 322 is shown to have a time constant $t3$ after which the logical output 5 is to be supplied. The appearance of the logical output 5 is thus indicative of the following; that the telephone rang for a time period of at least $t1$, no more than a time $t2$ ago, is not ringing now and has not rung for a time period of at least $t3$. The time period $t3$ is indicated in FIG. 3. The logical output 5 is applied to a one-shot circuit 326 via the lead 324. The output of the one-shot circuit 326, designated by the time period $t4$, defines a logical output 6 which is provided at an output lead 328 of the one-shot circuit 326. The logical output 6 of the one-shot circuit 326 demonstrates the following: that the telephone rang for a time period of at least $t1$, no more than a time period $t2$ ago, is not presently ringing, has not rung for a time period of at least $t3$, and that which happened at the logical output 5 has occurred no more than a time period $t4$ ago. The logical output 6 is applied via the lead 328 to a second AND gate 330. The other input to the AND gate 330 is the logical output 2 from the integrator 308 which is applied to the AND circuit 330 via a lead 332 coupled to the output of the integrator 308. The output of the AND gate 330 is provided at a lead 334 that supplies the final logical output 7 which is indicative of the fact that a true ring signal has been received at the input lead 224 to the ring detector and that the telephone should be answered. More particularly, the logical output defines that: the telephone rang for a time period of at least $t1$, stopped ringing for a time period of at least $t3$ but not more than $t2$, and then rang again for a time period of at least $t1$ no more than a time period $t4$ later.

It can thus be seen by comparison with the time sequence plot of FIG. 3 that the circuitry as described in FIG. 2 has sensed that a true ring signal has been received and that the telephone should be answered to complete the communication link therebetween. If any of the sequence of operation does not occur during the indicated time periods, the logical output 7 will not be provided therefore indicating that only a partial ring or some malintended ringing has been received. The use of the logical sequence of the telephone ringing and silence time periods greatly limits misanswering by the autoanswering mechanism 16 in comparison to systems which utilize such techniques as sensing the frequency of ring or other audiosensing techniques. The time periods $t1$, $t2$, $t3$ and $t4$ can, of course, be independently adjusted to accommodate the particular ring sequence of a given telephone. In such a manner, the ring detector can be made very sensitive to the particular ring of the associated telephone for increased sensitivity of response to a true ring signal while eliminating spurious ones.

Although the present invention has been described with a certain degree of particularity, it should be understood that the present disclosure has been made only by way of example and that numerous changes can be made in the details of construction and the combination and arrangement of elements, components, and circuitry without departing from the scope and the spirit of the present invention.

I claim:

1. An automatic telephone answering mechanism for providing a communicative linkup between a caller and a receiver by removing a handset from the cradle contacts of a telephone when said telephone rings in response to signals from said caller comprising:

transducer pickup means disposed adjacent said handset and adapted to sense a ring signal emitted by said telephone and convert said ring signal to an electrical signal;

ring detector means, coupled to said transducer pickup means, to discard spurious ring signals detected by said transducer pick up means and to produce an output signal from only ring signals emanated by said caller;

said ring detector means comprising;

first means for providing a first output indicative of ringing or not ringing in response to a ring signal, a timing means coupled to said first means for providing a second output when a ringing has occurred for at least a first period of time, a signal generator means coupled to said timing means for providing a third output indicative that ringing occurred for at least said first time period and this occurred during a second time period or before said second time period, a logic circuit means coupled to said first means and to said generating means for providing a fourth output indicative that ringing occurred during said first time period and no ringing has occurred prior to the end of said second time period, a second timing means coupled to said logic circuit for providing a fifth output indicative that ringing occurred for at least a third time period but not longer than said second time period, a second signal generator means coupled to said second timing means for providing a sixth output indicative that said sixth output occurred no longer than a fourth time period from said third time period ago, a second logic circuit means coupled to said second signal generator and said first timing means for providing a seventh output indicative that ringing occurred for at least said first time period, no ringing occurred for at least said third time period but no longer than said second time period and ringing occurred again for at least said first time period no later than said fourth time period after said third time period, and electromechanical force means disposed adjacent said handset and adapted to receive said output signal whereby said handset is removed from said cradle contacts of said telephone.

2. The automatic telephone answering mechanism of claim 1 wherein:

said first means comprises a discriminating circuit for providing said first output in response to a ring signal;

said timing means comprises a first integrating circuit for providing said second output in response to said first output;

said signal generator means comprises a first one-shot multivibrator circuit for providing said third output in response to said second output;

said logic circuit means comprises a first AND circuit for providing said fourth output in response to said first and third outputs;

said second timing means comprises a second integrating circuit for providing said fifth output in response to said fourth output;

said second signal generator means comprises a second one-shot multivibrator circuit for providing said sixth output in response to said fifth output; and said second logic circuit means comprises a second AND circuit for providing said seventh output in response to said second and sixth outputs.

UNITED STATES PATENT OFFICE

CERTIFICATE OF CORRECTION

Patent No. 3,555,189 Dated January 12, 1971

Inventor(s) Jesse T. Quatse

It is certified that error appears in the above-identified patent and that said Letters Patent are hereby corrected as shown below:

In the heading to the printed specification, lines 1 and 2, "Jesse T. Quatse, 613 Copeland St., Pittsburgh, Pa should read -- Jesse T. Quatse, Pittsburgh, Pa., assignor t VDP Corporation, Long Island, N. Y., a corporation of New York --.

Signed and sealed this 6th day of April 1971.

(SEAL)
Attest:

EDWARD M.FLETCHER,JR.
Attesting Officer

WILLIAM E. SCHUYLER,
Commissioner of Paten